United States Patent [19]
Neal et al.

[11] Patent Number: 5,129,735
[45] Date of Patent: Jul. 14, 1992

[54] TRASH COMPACTOR BAG

[75] Inventors: Robert A. Neal, R.F.D. 1, East Rd., Wales, Me. 04280; Robert B. Ray, Lake Shore Dr., Auburn, Me. 04210

[73] Assignees: Robert A. Neal; Robert B. Ray, Greene, both of Me.

[21] Appl. No.: 487,430

[22] Filed: Mar. 22, 1990

Related U.S. Application Data

[63] Continuation of Ser. No. 282,613, Dec. 12, 1988.

[51] Int. Cl.$^5$ .............................................. B65D 30/08
[52] U.S. Cl. ....................................... 383/109; 383/32; 383/35; 383/120; 220/404; 428/35.5
[58] Field of Search ....................... 383/1, 32, 109, 116, 383/120, 35; 220/403, 404; 428/2, 34.3, 35.2, 35.5, 516

[56] References Cited

U.S. PATENT DOCUMENTS

| | | | |
|---|---|---|---|
| 3,547,754 | 12/1970 | Tokos et al. | 383/32 X |
| 4,464,426 | 8/1984 | Anthony | 383/109 X |
| 4,511,609 | 4/1985 | Craver et al. | 220/403 X |
| 4,560,598 | 12/1985 | Cowan | 383/32 X |
| 4,648,508 | 3/1987 | Neal et al. | 206/328 |
| 4,797,318 | 1/1989 | Brooker et al. | 428/296 X |

FOREIGN PATENT DOCUMENTS

| | | | |
|---|---|---|---|
| 97182 | 8/1979 | Japan | 383/116 |
| 1-296963 | 11/1989 | Japan | 383/109 |
| 2198062 | 6/1988 | United Kingdom | 428/35.2 |
| 2218997 | 11/1989 | United Kingdom | 383/32 |

*Primary Examiner*—Stephen P. Garbe
*Assistant Examiner*—Jes F. Pascua
*Attorney, Agent, or Firm*—Auslander & Thomas

[57] ABSTRACT

The invention features a single film construction with two distinctly different surface characteristics for a trash compactor bag composite. The high slip interior layer integrally bonded to a tacky carbon outside layer forms a moisture proof, odor adsorbing trash compactor refuse receptacle. The construction may be made of biodegradable plastic.

12 Claims, 2 Drawing Sheets

TRASH COMPACTOR BAG

This application is a continuation of application Ser. No. 282,613, filed Dec. 12, 1988.

FIELD OF THE INVENTION

The invention relates to trash compactor bags or sacks utilized for the storage and disposal of household and business garbage, waste or trash material, and more particularly, to an odor eating, waterproof refuse receptacle for trash compactors. The present invention relates to trash compactor bags or sacks, that adsorb odor and have an interior slippery surface and an exterior clinging surface. The landfill shortage also has reached crisis stage within recent years in a number of cities and there is presently a need for a biodegradable plastic trash compactor or sack.

BACKGROUND OF THE INVENTION

Since the invention of the trash compactor, both paper and plastic bags have been used. The paper bag is lined with an interior polyolefin material to help promote a slippery interior surface and help prevent trash materials from wetting or soaking the paper bag, causing the bag to break apart. The outside paper layer of such bags provides the strength of the bag, while the interior plastic layer merely acts like a liner. Therefore, once the outer paper layer is punctured, the strength of the bag disappears. The result is a bag that absorbs moisture, emits odors and breaks apart.

Plastic and biodegradable plastic trash compactor bags now available on the market are slippery on the interior surface as well as on the exterior surface. These bags do not cling well to the compactor itself. Although the bag is moisture proof, there is nothing in the plastic material to help adsorb trash odors.

BRIEF DESCRIPTION OF THE RELATED ART

U.S. Pat. No. 4,478,903 discloses a carbon containing laminate whose base material is ABS or salystyrene. The laminate is useful in circuit board packaging and is a stiff, inflexible coextrusion. The carbon is for the purpose of providing conductivity. While the laminate is coextruded and contains carbon, there is little resemblance to the invention, either in the inventive purpose or construction.

U.S. Pat. No. 4,444,828 describes a multilayer plastic film for use in trash bags. The film is coextruded. Colorants are added to the plastic melt, there is no suggestion of the addition of odor adsorption agents or those providing tackiness. This patent is basically a teaching of providing proper layer thickness to improve melt indices. Slip agents are suggested.

U.S. Pat. No. 4,258,848 discloses a package laminate for photo film. Carbon is added to polyethylene to absorb light, rather than adsorb odors. Other agent additives are suggested to lubricate or provide UV absorption.

U.S. Pat. No. 4,147,291 provides a similar teaching as in U.S. Pat. No. 4,258,848. Suggestion is made that the wrapping can be used to preserve foodstuffs that deteriorate with light. Carbon is only six per cent by weight.

U.S. Pat. No. 4,421,805 discloses a plastic film coated with a slip-resistant film. Polyamide resin is used for the above-mentioned purpose.

U.S. Pat. No. 3,525,467 is a similar teaching to the above U.S. Pat. No. 4,421,805, wherein the non-slip materials, such as grit and asphalt, are imbedded in the bag surface.

U.S. Pat. No. 3,396,901 discloses a plastic bag container for bulk shipment of materials such as fertilizer. The outer layer is frictional due to chlorination of the plastic surface. Additives such as lubricants are suggested.

U.S. Pat. No. 3,246,831 illustrates a slip-resistant plastic sheet having a silica-latex coating.

U.S. Pat. No. 2,643,048 teaches a colloidal silica impregnated cellulose bag which is slip resistant.

U.S. Pat. No. 3,321,125 discloses a thermoplastic shipping bag with a "tacky" outer layer and a slidable non-stick inner layer.

U.S. Pat. No. 3,494,457 illustrates a bag with similar attributes to the above U.S. Pat. No. 3,321,125. Oxygen and vapor barriers are suggested between the laminate layers. However, no suggestion is made of odor adsorption.

BRIEF SUMMARY OF THE INVENTION

The present invention fabricates a flexible refuse receptacle for a compactor by the process of blown film coextrusion. The bag has an inner slippery polyethylene layer and an outer carbon containing polyethylene layer which is made integral with the inner layer by coextruding the polyethylenes in the liquid state. Thus, a single, integral film layer is formed, having two distinctly different properties. The present invention may employ biodegradable plastics such as Polygrade TM, Polygrade II TM or Polygrade III TM. Sold by Ampacet Corporation of Mount Vernon N.Y.

The inner layer has a slippery surface which allows the trash to flow to the bottom of the refuse receptacle during the compaction cycle. The slippery layer also helps prevent the compactor from abrading or tearing a hole in the trash compactor bag. The outer, carbon laden, layer has a tacky surface which clings to the compactor and keeps the bag in place while the trash is being compacted. Carbon in the outer layer also adsorbs most trash odors.

The thickness of each plastic layer is approximately from one to four mils. The carbon contained in the outer polyethylene layer generally ranges from approximately ten to forty per cent by weight. In a preferred embodiment, the carbon range is from ten to twenty percent.

The plastics are coextruded into a tube or sheet at a temperature in the range of 320° F. to 350° F. The bag is formed by conventional polyethylene bag making equipment, such as a Kieffel coextrusion film line.

BRIEF DESCRIPTION OF THE DRAWINGS

Although such novel feature or features believed to be characteristic of the invention are pointed out in the claims, the invention and the manner in which it may be carried out may be further understood by reference to the description following and the accompanying drawings.

DETAILED DESCRIPTION OF THE INVENTION

Referring to the figures in greater detail, where like reference numbers denote like parts in the various figures.

Figure 1:
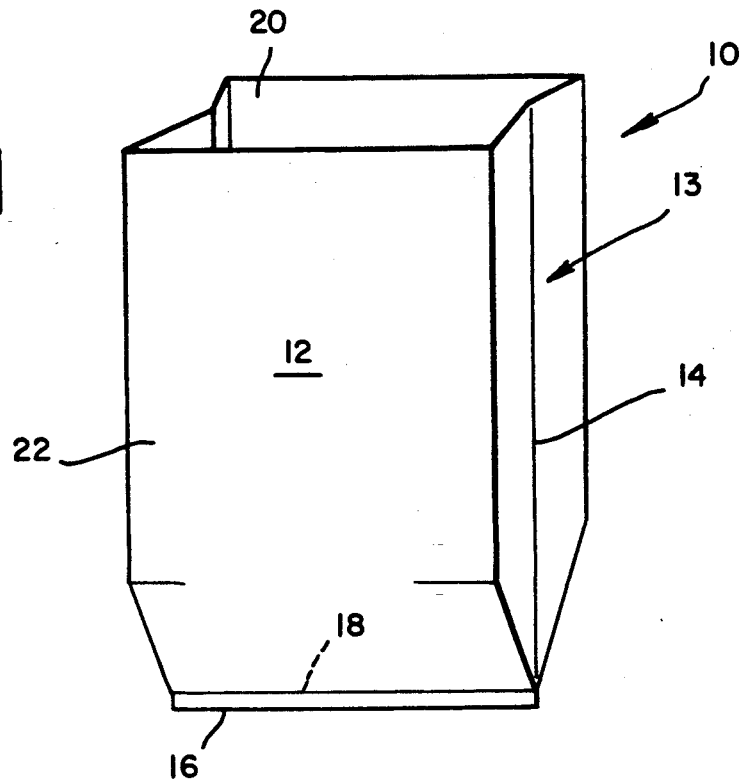
FIG. 1 is a perspective view of the trash compactor bag of this invention utilizing a coextruded envelope having an outer tacky carbon surface and inner slippery surface.

FIG. 1 is a view of the trash compactor refuse receptacle 10, featuring an envelope of a single film 13 of composite material that is side gusseted at 14 to form a rectangle shape when opened. The receptacle 10 is cut at 16 to length, after being heat sealed along the bottom edge 18. The inner layer 20 of the receptacle 10 comprises a slippery heat sealable plastic, and the outer layer 22 comprises a tacky carbon-loaded plastic.

Figure 2:
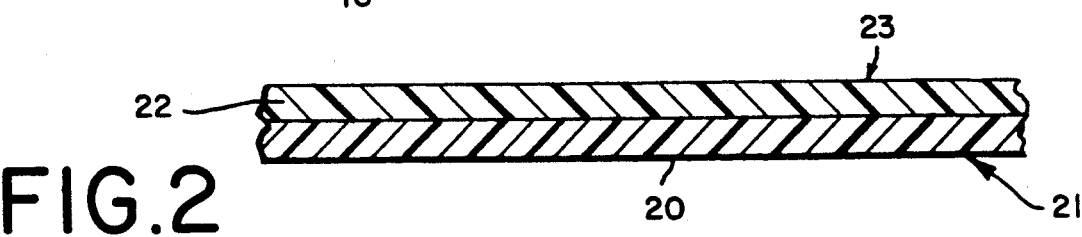
FIG. 2 is an enlarged sectional view of FIG. 1, showing the two distinctly different layers of the bag formed as one integral film.

Referring to FIG. 2, it shows an enlarged sectional view of the envelope 12 of the single film 13 of the composite material, illustrated in FIG. 1. The inner layer 20 is comprised of a heat sealable slippery polyolefin. The slippery surface 21 of layer 20 may be obtained from many polymers, including biodegradable plastics which will accept the addition of a wide variety of internal slip agents. The slippery surface 21 will allow trash to be compressed easily without abrading and rupturing the receptacle 10. The outer layer 22 may be made from a number of polymers and copolymers including biodegradable plastics which allow loading of carbon materials and fillers to levels sufficient to promote tackiness of cling on the outer surface 23, and adsorption of odors. Types of polymers can be low density polyethylene, linear low density polyethylene, high density polyethylene and many other polymers and copolymers, like L. D. EVA. Of course biodegradable plastics may be used.

Figure 3:
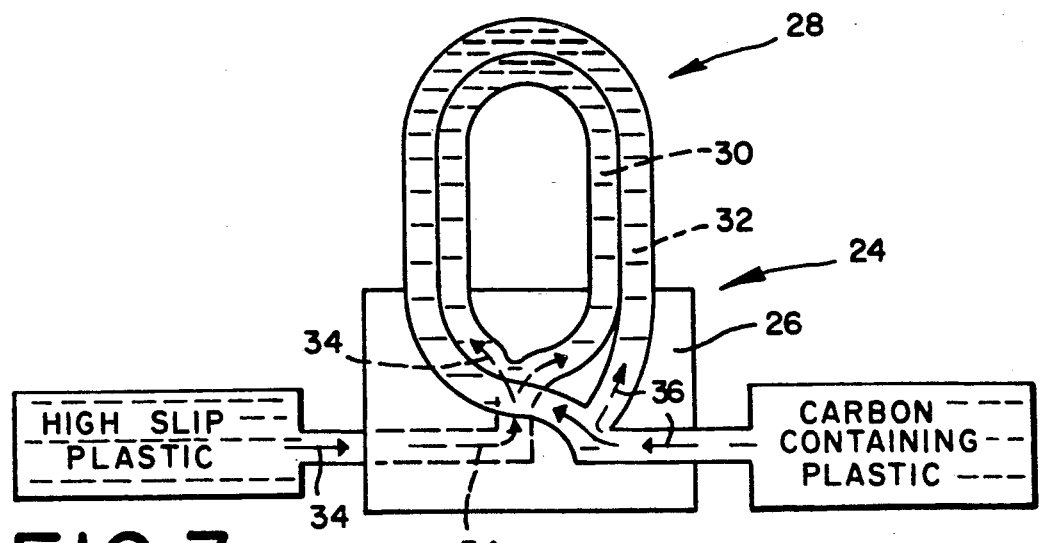
FIG. 3 is a schematic sectional view of the trash compactor bag being manufactured by a coextruder.

Referring to FIG. 3, a schematic sectional view of a coextruder 24 (Kieffel coextrusion film line), a single film of two layers can be manufactured, wherein each has two distinctly different surface characteristics. The material that forms the plastic inner layer 20 of FIGS. 1 and 2 leaves the coextruder die 26 (arrows 34) in liquid form 30 and cools to form the inner layer 20 of the film 13. The material that forms the carbon plastic outer layer 22 of FIGS. 1 and 2, leaves the coextruder die 26 (arrows 36) in liquid form 32 to form the outer layer 22 of the film 13. The envelope 10 of blown film 13 is achieved by injecting or forcing gas or air, under pressure, into the center of the coextruded materials 30 and 32, which can be extruded in tube or sheet form. The two materials bond together while in the liquid state and form an integral film 13 with two distinctly different surfaces 21 and 23, respectively, when cooled. Characteristics of blow rate and melt index of each type of polymer varies, but most are easily extruded, due to the inner layer 30 which supports the outer layer 32 in the form of a bubble of blown film 13.

The thickness of each plastic layer 20, 22 is preferably approximately from two to four mils. The carbon contained in the outer polyethylene layer 22 generally ranges from ten to forty per cent by weight. In a preferred embodiment, the outer layer 22 has a carbon range of from ten to twenty percent by weight.

The carbon contained in the outer polyethyelene layer 23 also provides a tacky surface, so that the outer layer 23 tends to cling to the surface of the trash compactor and not slide with respect to the trash compactor.

Carbon in the outer polyethylene layer 23, in a range from one to ten per cent, provides a range of odor adsorption and some tackiness to the outer layer 23 of the envelope 12.

Figure 4:
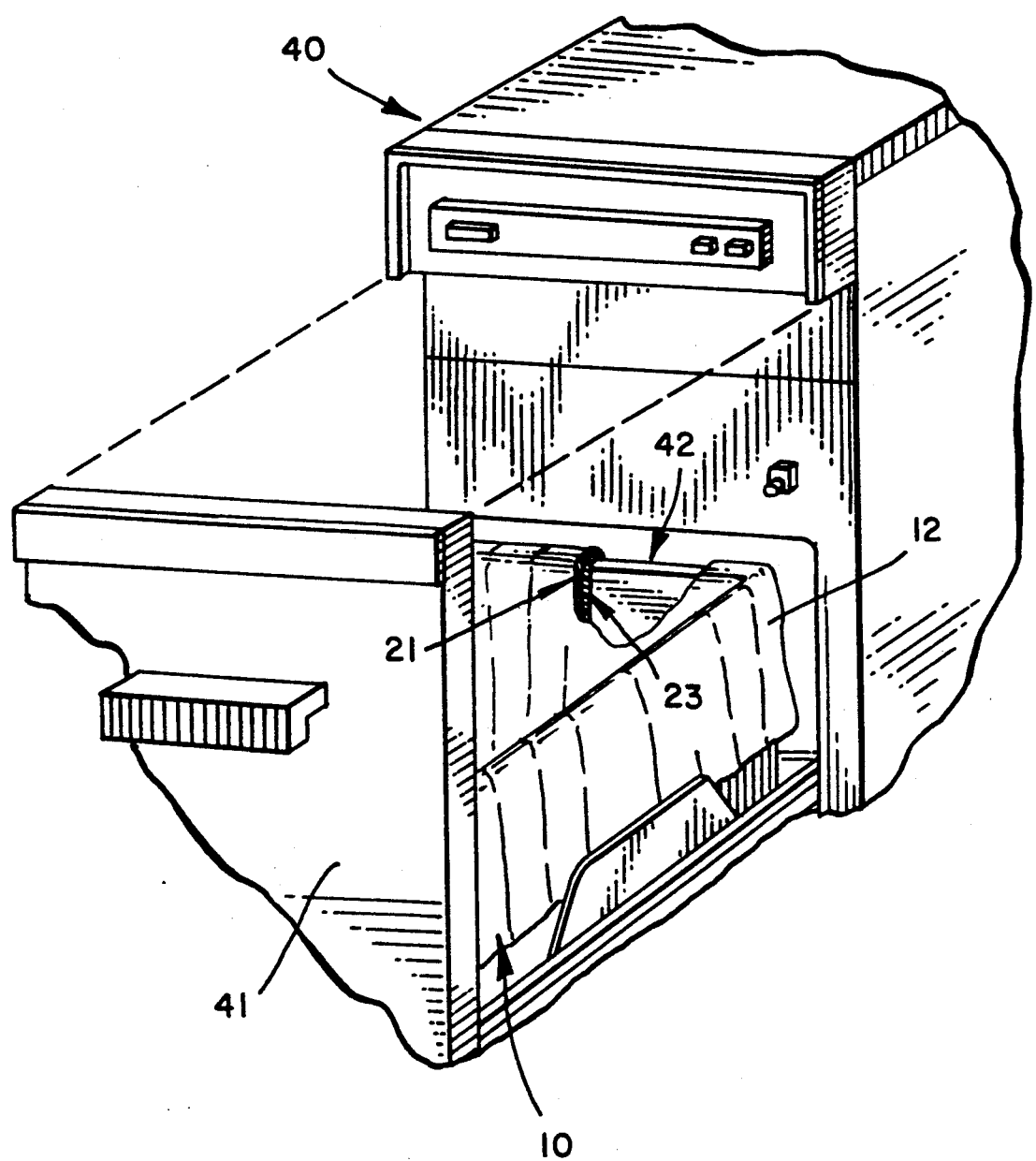
FIG. 4 is an isometric view of a trash compactor showing a multi-layer bag in contact with the inner wall of the compactor.

Referring to FIG. 4, a detail of compactor 40 is shown with its drawer 41 extended open and including an engaged refuse receptacle 10 draped over the inner frame of the drawer 41. As can be seen in the figure, the envelope 12 is cut away. The outer surface 23 of the envelope 12 can be seen clinging to the inner wall 42 of the compactor drawer 41 and the slippery inner surface 21 is exposed to slidably receive refuse within the refuse receptacle 10 in the envelope 12.

The terms and expressions which are employed are used as terms of description; it is recognized, though, that various modifications are possible.

It is also understood the following claims are intended to cover all of the generic and specific features of the invention herein described, and all statements of the scope of the invention, which as a matter of language, might fall therebetween.

Having described certain forms of the invention in some detail, what is claimed is:

1. A refuse bag for a trash compactor, said trash compactor including an inner wall, said refuse bag comprising a flexible envelope, said envelope including a unitary wall, said unitary wall comprising an inner layer and outer layer, said inner and outer layer integrally formed of plastic fabricated by blow film coextrusion while said plastic is in a liquid state, said unitary wall having a size selected to engage the inner wall of said trash compactor, said inner layer of said wall having a slippery surface, and said outer layer of said wall containing carbon and having a tacky surface, whereby said outer layer's tacky surface is adapted to non-slidably engage said inner wall of said trash compactor and also adsorb odor.

2. The refuse bag of claim 1, wherein said inner layer comprises a polyethylene plastic.

3. The refuse bag of claim 1, wherein said odor adsorbing outer layer comprises a carbon-containing polyethylene plastic.

4. The refuse bag of claim 3, wherein said carbon-containing polytheylene plastic comprises carbon by weight in an approximate range of from one to ten per cent.

5. The refuse bag of claim 3, wherein said carbon-containing polyethylene plastic comprises carbon by weight in an approximate range of from ten to twenty per cent.

6. The refuse bag of claim 2, wherein said odor adsorbing outer layer comprises a carbon-containing polyethylene plastic.

7. The refuse bag of claim 1, wherein said inner layer has a thickness in a range from approximately one to four mils.

8. The refuse bag of claim 1, wherein said outer layer has an approximate thickness in a range from one to four mils.

9. A refuse bag for a trash compactor, said trash compactor including an inner wall, said refuse bag comprising a flexible envelope, said envelope including a unitary wall, said unitary wall comprising an inner layer and outer layer, said inner and outer layer integrally formed of plastic fabricated by blow film coextrusion while said plastic is in a liquid state, said unitary wall having a size selected to engage the inner wall of said trash compactor, said inner layer of said wall including material imparting a slippery surface to said wall, said outer layer of said wall containing carbon, and said outer layer further including material imparting a tacky surface to said wall, whereby said outer layer's tacky surface is adapted to non-slidably engage said inner wall of said trash compactor and also adsorb odor.

10. In combination with a trash compactor a refuse bag, said refuse bag comprising a flexible envelope, said envelope including a unitary wall, said unitary wall comprising an inner layer and outer layer, said inner and outer layer integrally formed of plastic fabricated by blow film coextrusion while said plastic is in a liquid state, said inner layer of said wall having a slippery surface, said outer layer of said wall containing carbon and having a tacky surface, and said outer layer of said wall engaging the inner wall of said trash compactor, whereby said outer layer's tacky surface non-slidably engages said bag at said inner wall of said trash compactor and also adsorbs odor.

11. The refuse bag of claim 1 including at least one gusset.

12. In combination with a trash compactor a refuse bag, said refuse bag comprising a flexible envelope, said envelope including a unitary wall, said unitary wall comprising an inner layer and outer layer, said inner and outer layer integrally formed of plastic fabricated by blow film coextrusion while said plastic is in a liquid state, said inner layer of said wall including material imparting a slippery surface to said wall, said outer layer of said wall containing carbon, and said outer layer further including material imparting a tacky surface to said wall, and said outer layer of said wall engaging the inner wall of said trash compactor, whereby said outer layer's tacky surface non-slidably engages said bag at said inner wall of said trash compactor and also adsorbs odor.

* * * * *